US011320262B2

(12) United States Patent
Rabot et al.

(10) Patent No.: US 11,320,262 B2
(45) Date of Patent: May 3, 2022

(54) GEOLOCATION METHOD AND SYSTEM FOR IMPLEMENTING SAME

(71) Applicant: SOLETANCHE FREYSSINET, Rueil-Malmaison (FR)

(72) Inventors: Yohan Rabot, Toulouse (FR); Gilles Hovhanessian, Antony (FR); Maxime Trocme, Paris (FR); Jerome Stubler, Paris (FR)

(73) Assignee: SOLETANCHE FREYSSINET, Rueil-Malmaison (FR)

( * ) Notice: Subject to any disclaimer, the term of this patent is extended or adjusted under 35 U.S.C. 154(b) by 491 days.

(21) Appl. No.: 16/444,756

(22) Filed: Jun. 18, 2019

(65) Prior Publication Data

US 2020/0080842 A1    Mar. 12, 2020

(30) Foreign Application Priority Data

Jun. 18, 2018 (FR) .................................... 18 55329

(51) Int. Cl.
*G01C 15/00* (2006.01)
*G06K 19/06* (2006.01)
*G06T 17/05* (2011.01)

(52) U.S. Cl.
CPC ...... *G01C 15/004* (2013.01); *G06K 19/06028* (2013.01); *G06K 19/06037* (2013.01); *G06T 17/05* (2013.01)

(58) Field of Classification Search
None
See application file for complete search history.

(56) References Cited

U.S. PATENT DOCUMENTS

| 2010/0020074 | A1* | 1/2010 | Taborowski | G06T 7/70 345/420 |
| 2014/0346223 | A1* | 11/2014 | Van Sickle | G09B 25/02 235/375 |
| 2017/0116781 | A1* | 4/2017 | Babahajiani | G06T 17/20 |
| 2020/0034590 | A1* | 1/2020 | Howard | G06K 7/1417 |

* cited by examiner

*Primary Examiner* — Kristy A Haupt
(74) *Attorney, Agent, or Firm* — Oblon, McClelland, Maier & Neustadt, L.L.P.

(57) ABSTRACT

A system having:
a terrestrial scanning device,
a topographic benchmark secured permanently to a support, including a code that is readable automatically at a distance of at least 3 m by the scanning device, this code ss providing information as to the position of the benchmark in a given frame of reference and/or having an identifier listed in a database in which the position of the benchmark in said frame of reference is also recorded.

24 Claims, 2 Drawing Sheets

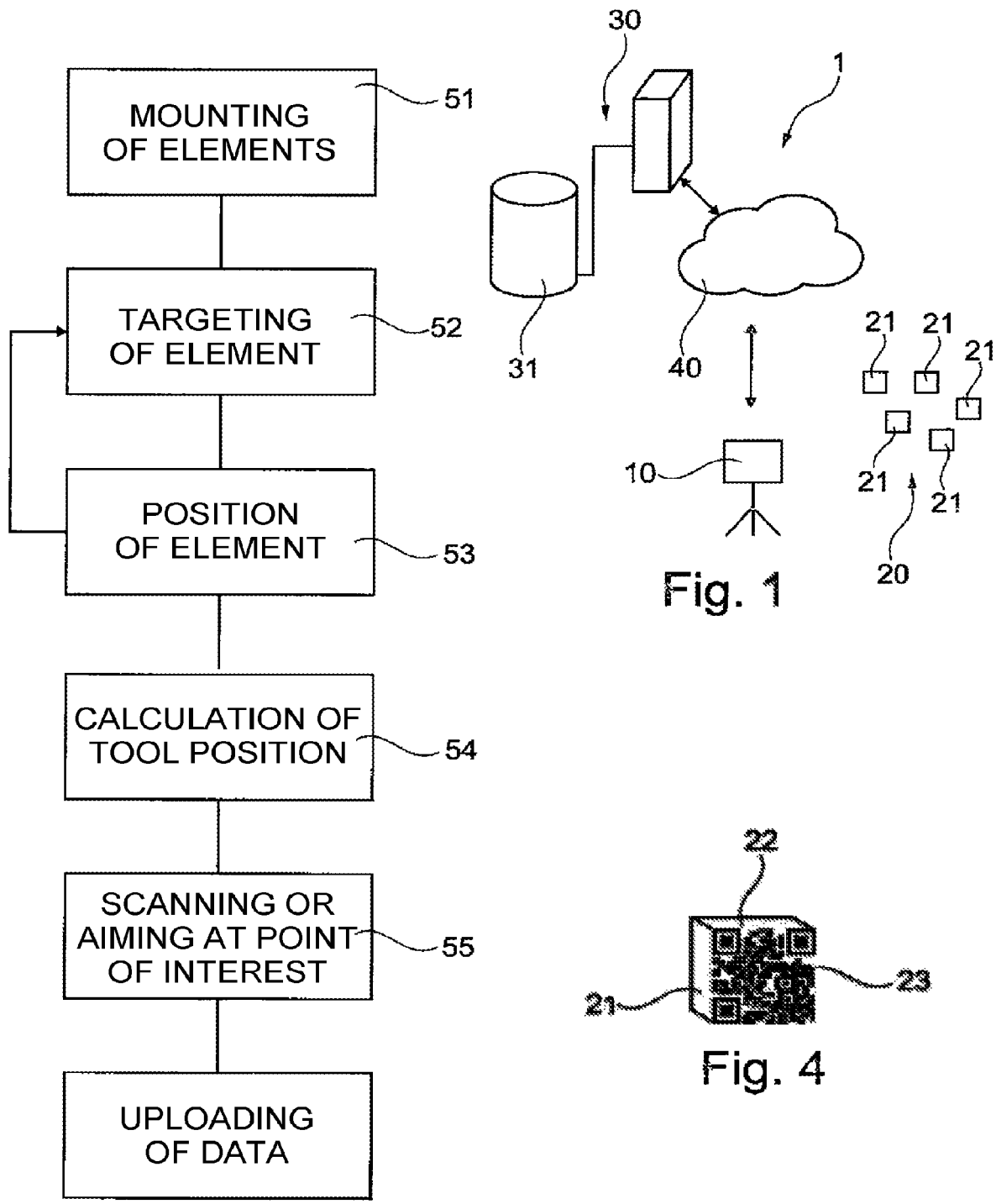

GEOLOCATION METHOD AND SYSTEM FOR IMPLEMENTING SAME

The present invention relates to geolocation methods and systems used notably in an urban environment, and to methods for generating 3D models on the basis of surveys carried out in the environment of a terrestrial scanning device.

PRIOR ART

It is known practice to use satellite positioning systems for geolocating oneself. However, apart from using expensive receivers, the accuracy is not generally sufficient for numerous applications such as the generation of 3D models of the environment.

Moreover, it can prove difficult to receive the GPS signal in certain urban environments or dense forests.

It is known practice to geolocate oneself on a site on the basis of a survey of characteristic points thereon. The location of these points is marked in advance by a topographer. In order to geolocate these characteristic points, the topographer can use a theodolite, a tacheometer or a total station and make use of targets placed at specific points. This operation requires the involvement of a qualified operator, and has a temporary nature since the targets disappear at the end of the site.

Numerous other situations exist in which the involvement of a topographer is necessary, in order to make digital models of landscapes or existing buildings, or to locate the perimeter of underground works for example.

The manufacturers of laser topography measuring appliances have developed entirely robotic stations that relieve the topographer of operations of aiming at targets and that automatically record the topographic readings. However, the topographer still needs to be involved each time to position the targets during the measurement.

It is also known practice to use points marked on the ground, or ground control points, that are visible and georeferenced in order to readjust the aerial acquisitions carried out by airplane, helicopter or drone. These aerial acquisitions can be used to reconstruct a 3D map of an urban environment, as described in the U.S. Pat. No. 8,818,076.

The application WO2017/117667A1 describes a method for surveying underground tunnels in order to correct a drift of the estimated position of a mobile scanner situated in the tunnel over time and/or as it is moved. Acquisitions of the profile of the tunnel are taken at control points by a laser scanner in the presence of an RFID chip providing a unique identifier to the acquisition, and the corresponding data are recorded in a database. These reference acquisitions can then be compared with the subsequent acquisitions carried out by the mobile scanner in order to correct the abovementioned problem of drift.

The application US2015/0170368 discloses a geolocation method based on the acquisition of images by a cellular telephone for example, and the finding of a correlation between notable points of the images acquired by the telephone and a catalog of reference images in which these same points have been georeferenced. The method can involve the selection from the image of points intended to be geolocated. Such a method is highly dependent on the quality of acquisition of the images and on the capacity of the computer system to detect the corresponding reference images.

There is a need to make it easier to make digital models of an environment, notably an urban exterior, or to be able to geolocate oneself without difficulty before works are carried out, so that these jobs can be given to workers who are less qualified than a topographer or so as to make the latter's work easier.

SUMMARY OF THE INVENTION

The invention aims to meet this need and achieves this aim, according to a first of its aspects, by providing a system having:
- a terrestrial scanning device,
- a topographic benchmark secured permanently to a support, including a code that is readable automatically at a distance of at least 3 m by the scanning device, this code providing information as to the position of the benchmark in a given frame of reference and/or having an identifier listed in a database in which the position of the benchmark in said frame of reference is also recorded.

Said frame of reference may be an absolute frame of reference. The expression "absolute frame of reference" means a geodetic frame of reference in which the location of an object on Earth can be defined unequivocally. Its center is for example close to the center of mass of the Earth, its two first axes are in the plane of the equator, and its third axis is close to the axis of rotation of the Earth. The absolute frame of reference that can be used in the scope of the present invention is preferably chosen from the following: Réseau Géodésique Français 1993 (RGF93), World Geodetic System (WGS84), International Terrestrial Rotational Service (ITRS) or European Terrestrial Reference System (ETRS).

The code may include information about the positional accuracy of the benchmark in said frame of reference, or this information may be accessible via said database.

The benchmarks may be geolocated in said frame of reference with accuracy greater than 40 cm, better still 10 cm, even better still 1 cm.

The benchmarks may be spread over an area greater than 1 km$^2$, and/or at a density greater than 100 per km$^2$, and/or with a distance between two close-together benchmarks of between 5 and 100 m.

The code of each benchmark may be a barcode or a matrix code, in particular a QR code.

The code may be protected by a pane of glass or engraved or printed so as to withstand bad weather and solar radiation.

The benchmarks may be present on the façade of buildings, notably on a plate providing the number of the building or the name of a street.

Each benchmark may have a catadioptric prism.

Terrestrial Scanning Device

A "terrestrial scanning device" means any system for implementing the method according to the invention and notably for acquiring geometric information about a given environment. The terrestrial scanning device can rest on the ground at the time of acquisition, for example be mounted on a vehicle moving along the street, for example on the road, or carried manually by a worker. The terrestrial scanning device can image the façades of buildings and other infrastructure or equipment with an aiming axis that is not vertical from top to bottom, its aiming axis being for example oblique from bottom to top or horizontal during the scan. The scanning device can have a memory for storing data transmitted by the topographic benchmark. The terrestrial scanning device can benefit from communication means allowing it to interrogate a database on the basis of the information read on the topographic benchmark.

The terrestrial scanning device may thus have:

- at least one optical sensor for making an optical acquisition of the environment of the terrestrial scanning device,
- an image processing system, for example a specialized processor or microcomputer, designed to process an image received by the sensor in order to decode the data of the geolocated benchmark,
- a locating system, for example a specialized processor or a microcomputer, for calculating, from the data read and from the orientation of the terrestrial scanning device with respect to a point of interest, the position of this point of interest in said frame of reference.

The image processing and locating systems may be for example the same specialized processor or the same microcomputer. At least a part of the processing and of the calculations can be offloaded to a remote server, for example incorporated in a digital platform to which the scanning device is connected.

The terrestrial scanning device may have any element known from lasergrammetry or photogrammetry appliances. The scanning device may have at least one photo sensor or video sensor for acquiring information in the form of 2D or 3D images, or one or more static or dynamic laser scanners for acquiring the information in the form of clusters of points. The laser scanner may advantageously be linked to a photo sensor or video sensor.

The scanning device may have a laser telemeter and/or a laser aiming device for pointing the scanning device at the geolocated benchmark or toward a point of interest, the position of which in said frame of reference is desired to be known. The terrestrial scanning device may thus have at least one laser. The laser may help to aim at a point of interest. The scanning device may have a lidar.

The scanning device may have a camera for reading the data present on the topographic benchmark and/or for acquiring an image of the immediate environment thereof.

The scanning device may have a means for automatically scanning the environment thereof, notably by mechanical driving of an optic.

The terrestrial scanning device may have a telecommunications system for communicating with a remote computer platform for providing it with an identifier of the topographic benchmark geolocated by the scanning device and for receiving in return the position of the topographic benchmark in said frame of reference.

The terrestrial scanning device may have a tripod and an articulation for orienting it in terms of azimuth and elevation.

The terrestrial scanning device may also have a radiofrequency system capable of reading information inherent to the topographic benchmark, if need be, when the latter is equipped with an RFID chip for example.

A further subject of the invention, according to another of its aspects is a method for acquiring 3D data of an environment, notably an urban environment, with the aid of a system according to the invention, wherein:

- an optical acquisition is carried out with the aid of the terrestrial scanning device, this optical acquisition including at least the topographic benchmark,
- the code of the benchmark is read automatically,
- the position of the benchmark in a given frame of reference is determined from this code, and
- this information is used to georeference the 3D data acquired by the scanning device.

The environment in question is preferably an urban exterior zone, having for example buildings such as apartment buildings or office buildings, individual houses, urban furniture such as lamp posts, traffic lights, traffic signs, advertising panels, shelters or benches, among other things.

Acquisition of the Environment of the Terrestrial Scanning Device

The expression "acquisition of the environment of the terrestrial scanning device" should be understood as meaning recording of spatial data, notably the geometry of the environment. This acquisition may comprise laser aiming of one or more geolocated topographic benchmarks from one and the same position of the scanning device, in order to read the data carried on this benchmark and/or to read the identifier.

The acquisition of spatial data may be effected for example in the form of photogrammetric data, notably from sets of images or video sequences, or in the form of lasergrammetric data.

The acquisition may be effected with at least one rotation of the scanning device on itself about an axis of rotation, preferably fixed during this rotation, or with the aid of a plurality of sensors having different aiming axes. The acquisition may involve azimuth and elevation scanning of the zone of which the geometry is intended to be acquired by the acquisition means.

The acquisition may be effected at a distance of at least 5 m from at least one of said benchmarks, better still at least 10 m, or even at least 20 m.

The acquisition may be effected with the aid of at least one camera, equipped with a telescope for example, or of a lidar.

Topographic Benchmarks

The benchmarks may be secured to a building, a piece of equipment or a preexisting piece of urban furniture.

The code may include a unique identifier of the benchmark, notably in the form of a barcode or matrix code.

Each benchmark may have a catadioptric prism, as mentioned above.

The method for acquiring 3D data may also involve the step of interrogating a database, notably a remote database, by providing the identifier of the benchmark read by the scanning device, in order to obtain in return the position thereof in the given frame of reference, and preferably also to obtain an indication of the positional accuracy of the benchmark in this frame of reference.

The code that is readable by the scanning device may include the position of the benchmark in the given frame of reference, and preferably an indication of the positional accuracy of the benchmark in this frame of reference.

The method for acquiring 3D data may involve the generation of a 3D model of the environment of the scanning device on the basis at least of the knowledge of the position of the scanning device and of an acquisition of the geometry of the environment of the scanning device.

The acquisition by the scanning device may be carried out at a distance of at least 5 m from at least one of said benchmarks of which the code is read during said acquisition, better still at least 10 m, or even at least 20 m.

The method for acquiring 3D data may involve the reading by the scanning device of the codes of the benchmarks that are spread over an area greater than 1 $km^2$.

The method for acquiring 3D data may involve the reading by the scanning device of the codes of benchmarks that are spread at a density greater than 100 per $km^2$.

The method for acquiring 3D data may involve the reading by the scanning device of the codes of benchmarks that are separated by a distance of between 5 and 100 m.

The method for acquiring 3D data may involve the reading by the scanning device of the codes of benchmarks that are positioned in said frame of reference with location accuracy greater than 0.4 m, better still greater than 0.2 m, even better still greater than 0.1 m, notably between 1 and 10 cm.

A further subject of the invention, according to another of its aspects, is a method for mounting at least one topographic benchmark formed by an attachment having an identifier inherent thereto, for implementing the method for acquiring 3D data according to the invention, involving:
the mounting of the benchmark,
the geolocation of the benchmark thus mounted in a given frame of reference,
the recording in a database of the identifier of the benchmark and the position of the benchmark in said frame of reference.

Information relating to the positional accuracy of the benchmark in said frame of reference may also be recorded in the database, so as to allow this information to be subsequently accessed by providing the identifier of the benchmark as input.

Alternatively, the method for mounting at least one topographic benchmark formed by an attachment on a support, having an optical code inherent thereto, for implementing the method as defined above, this method involving:
the geolocation of the location on the support intended to receive the benchmark in a given frame of reference,
the generation of an optical code containing the geolocation information, such that the scanning device can read the code and automatically collect this information,
the permanent securing at said location of the topographic benchmark provided with the code thus generated.

Alternatively, the code includes information about the accuracy with which the position of the location intended to receive the benchmark is known in said frame of reference.

A further subject of the invention, according to another of its aspects, is a method for geolocating the terrestrial scanning device of a system according to the invention, wherein:
an optical acquisition is carried out with the aid of the terrestrial scanning device, this optical acquisition including at least the topographic benchmark,
the code of the benchmark is read automatically,
the position of the benchmark in a given frame of reference is determined from this code, and
at least this information is used to locate the scanning device.

As mentioned above, the topographic benchmarks are preferably geolocated in said frame of reference with an accuracy greater than 40 cm, better still 10 cm, even better still 1 cm, the benchmarks preferably being spread over an area greater than 1 km$^2$, and/or at a density greater than 100 per km$^2$, and/or with a distance between two close-together benchmarks of between 5 and 100 m.

Each benchmark may have an optically readable code, notably a barcode or a matrix code, in particular a QR code. This code may be protected by a pane of glass or be engraved or printed so as to withstand bad weather and solar radiation.

Each benchmark may have a radiofrequency electronic circuit designed to communicate with the terrestrial scanning device. This may make it possible for example to accelerate the automatic optical analysis of the topographic benchmark by the terrestrial scanning device, or to provide a unique identifier of the topographic benchmark if it does not have an optical code.

At least some of the benchmarks may be present on the façade of buildings, notably on a plate providing the number of the building or the name of a street. The indication that appears on the plate, such as the number or the name of the street, may optionally be part of the immediate environment of the benchmark for identifying the latter. In one example, the plate bearing the building number or the street name plate constitute geolocated benchmarks within the meaning of the invention.

Each benchmark may have a catadioptric prism, as mentioned above.

BRIEF DESCRIPTION OF THE FIGURES

The invention may be understood better from reading the following detailed description of nonlimiting exemplary embodiments thereof, and from studying the appended drawing, in which:
FIG. 1 schematically shows an example of a system for implementing the invention,
FIG. 2 is a block diagram illustrating the different steps in an example of a method according to the invention,
FIG. 4 shows an example of the geolocated topographic benchmark according to the invention.

DETAILED DESCRIPTION

Figure 3:
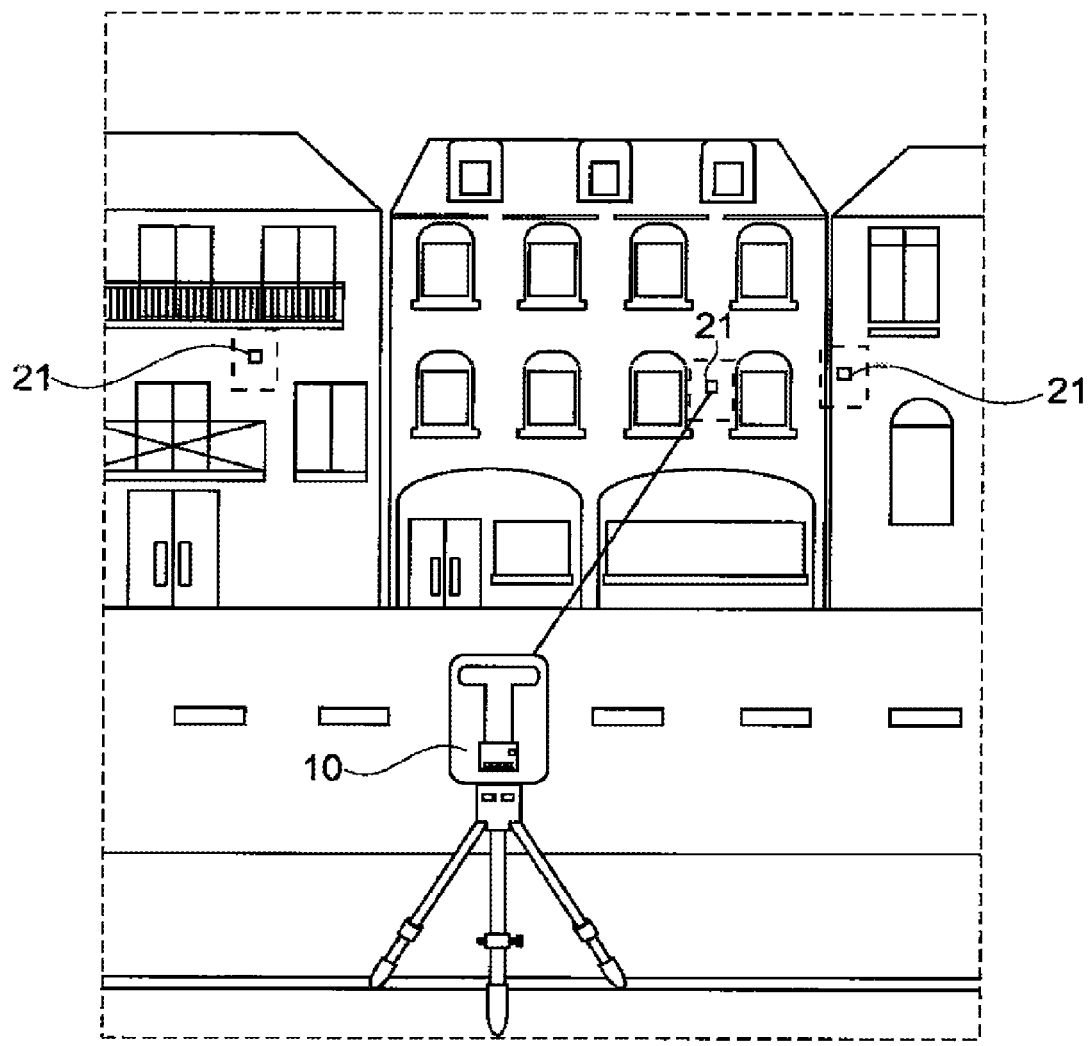
FIG. 3 illustrates the use of a system according to the invention.

FIG. 1 shows an example of a system 1 according to the invention.

This system has at least one terrestrial scanning device 10 and a set 20 of topographic benchmarks 21 geolocated by the terrestrial scanning device 10.

The system 1 may also have, as illustrated, a computer platform 30 with which the scanning device 10 can exchange data, for example via a telecommunications network 40 such as the GPRS network or the 3G or 4G network.

The topographic benchmarks 21 may, as illustrated in FIG. 4, have a support 22 which bears data, for example in the form of a matrix code 23, for example of the QR code type.

This code 23 may include the coordinates of the topographic benchmark 21 in a given frame of reference, or preferably a unique identifier of the topographic benchmark, which is listed in a database 31 accessible via the computer platform 30.

The support 22 is made for example of metal or plastic and is provided for example to be secured to a façade of a building.

The topographic benchmark 21 may be realized in a variety of ways and the invention is not limited to one particular type of support, or to a manner of bearing the information on the support 22.

An exemplary embodiment of the invention will now be described with reference to FIGS. 2 and 3.

First of all, the topographic benchmarks 21 are mounted in the urban environment, corresponding to step 51 in FIG. 2, by accurately determining their position, using for this purpose conventional geolocation techniques available to topographers, for example a total station.

When the benchmarks 21 bear a unique identifier, for example a matrix code as illustrated in FIG. 4, the identifier of the benchmark and the position thereof in said frame of reference are recorded in the database 31. The accuracy with which the position of the benchmark is known in said frame of reference can also be recorded in the database 31.

The density of placement of the geolocated topographic benchmarks 21 is preferably great enough for it to be possible to see at least two thereof in different locations in the urban environment in which the terrestrial scanning device can be disposed in order to carry out surveys before works or to scan the existing situation.

For example, if a trench is likely to be cut into the roadway in order to access buried networks, it is desirable to be able to survey the location of this trench using the system according to the invention.

The area equipped with geolocated topographic benchmarks may cover an entire neighborhood, or better still an entire city.

Once the geolocated topographic benchmarks have been mounted, they can remain in place for a very long time, not being intended to be removed but only to be replaced if necessary.

At any time, it is possible to geolocate the terrestrial scanning device 10 by positioning it such that it can aim at, or at least see, at least one of the topographic benchmarks 21, as illustrated in FIG. 3, and better still at least two of said topographic benchmarks 21, thereby allowing triangulation calculations.

Once the terrestrial scanning device 10 is in place, a first topographic benchmark 21 can be aimed at, as illustrated in FIG. 3, which corresponds to step 52 in FIG. 2.

The aiming can be automatic, that is to say that the terrestrial scanning device 10 scans its environment and in so doing detects the presence of one or more topographic benchmarks 21.

When the terrestrial scanning device 10 detects a topographic benchmark 21, it can know the position thereof in said frame of reference, this corresponding to step 53 in FIG. 2.

Specifically, the terrestrial scanning device 10 is able to recognize the topographic benchmark 21 by virtue of the code 23 that the scanning device 10 can read on the topographic benchmark 21. This code may include the position of the topographic benchmark 21, which is encoded in a predefined manner such that it can be read by the terrestrial scanning device 10, or a unique identifier of the topographic benchmark 21, in which case the terrestrial scanning device can interrogate the database 31 in order in return to know the position of the topographic benchmark 21 in said frame of reference.

Steps 52 and 53 can be repeated for each of the topographic benchmarks 21 that are detectable by the terrestrial scanning device 10.

Next, the position of the terrestrial scanning device can be determined by calculation in step 54, in the knowledge of the position of the topographic benchmarks 21 and the manner in which they are seen from the terrestrial scanning device 10.

Once the position of the terrestrial scanning device is known, the latter can be used for any type of survey or scan, in step 55. For example, it is possible to aim at any point of interest from the terrestrial scanning device and know its position in said frame of reference, and, in knowledge of the uncertainty about the position of the topographic benchmarks 21, also know the measurement accuracy.

It also possible to scan an existing construction or update a 3D model of a construction or of a city.

Such surveys or scans are possible without the aid of satellite networks, thereby allowing use in a dense urban environment.

If need be, the data resulting from the surveys or scans can be uploaded into the platform 30.

The invention is not limited to the examples that have just been described.

For example, the terrestrial scanning device 10 can be realized in some other way and the acquisition is carried out for example from a land vehicle or a drone moving along a street.

Depending on the geolocation accuracy desired for the terrestrial scanning device, the optical acquisition of the topographic benchmarks 21 can be carried out with or without laser aiming, and in one example this acquisition is realized only with the aid of one or more cameras.

Although the invention makes it possible to do away with satellite positioning of the scanning device, it remains possible to make use of satellite positioning of the scanning device to help identify the benchmarks 21 seen thereby. This is advantageous in particular when the benchmarks 21 are identified from their immediate environment. In this case, it is possible to find, in the catalog of reference images, those of which the position is close to the position given by satellite location, and this can accelerate the identification of the benchmark 21.

The invention claimed is:

1. A system having:
    a terrestrial scanning device,
    a topographic benchmark secured permanently to a support, including a code that is readable automatically at a distance of at least 3 m by the scanning device, this code providing information as to the position of the benchmark in a given frame of reference and/or having an identifier listed in a database in which the position of the benchmark in said frame of reference is also recorded.

2. The system as claimed in claim 1, the code including information about the positional accuracy of the benchmark in said frame of reference, or this information being accessible via said database.

3. The system as claimed in claim 1, the benchmark(s) being geolocated in said frame of reference with accuracy greater than 40 cm.

4. The system as claimed in claim 1, having benchmarks spread over an area greater than 1 $km^2$, and/or at a density greater than 100 per $km^2$, and/or with a distance between two close-together benchmarks of between 5 and 100 m.

5. The system as claimed in claim 1, the code of each benchmark being a barcode or a matrix code.

6. The system as claimed in claim 1, the code being protected by a pane of glass or being engraved or printed so as to withstand bad weather and solar radiation.

7. The system as claimed in claim 1, having benchmarks present on the façade of buildings.

8. The system as claimed in claim 1, the scanning device having:
    a laser telemeter,
    a laser aiming device,
    a lidar,
    a camera, and/or
    a means for automatically scanning the environment thereof.

9. A method for acquiring 3D data of an environment with the aid of a system as claimed in claim 1, wherein:
    an optical acquisition is carried out with the aid of the terrestrial scanning device, this optical acquisition including at least the topographic benchmark,
    the code of the benchmark is read automatically,
    the position of the benchmark in a given frame of reference is determined from this code, and this information is used to georeference the 3D data acquired by the scanning device.

10. The method as claimed in claim 9, at least one of the benchmarks being secured to a building, a piece of equipment or a preexisting piece of urban furniture.

11. The method as claimed in claim 9, the code including a unique identifier of the benchmark.

12. The method as claimed in claim 11, involving the step of interrogating a database, by providing the identifier of the benchmark read by the scanning device, in order to obtain in return the position thereof in the given frame of reference, and an indication of the positional accuracy of the benchmark in this frame of reference.

13. The method as claimed in claim 9, the code that is readable by the scanning device including the position of the benchmark in the given frame of reference, and an indication of the positional accuracy of the benchmark in this frame of reference.

14. The method as claimed in claim 9, the acquisition being carried out with at least one rotation of the scanning device on itself about an axis of rotation, or with the aid of a plurality of sensors having different aiming axes.

15. The method as claimed in claim 9, involving the generation of a 3D model of the environment of the scanning device on the basis at least of the knowledge of the position of the scanning device and of an acquisition of the geometry of the environment of the scanning device.

16. The method as claimed in claim 9, the acquisition by the scanning device being carried out at a distance of at least 5 m from at least one of said benchmarks of which the code is read during said acquisition.

17. The method as claimed in claim 9, the or each benchmark having a catadioptric prism.

18. The method as claimed in claim 9, the acquisition being carried out with the aid of at least one camera or of a lidar.

19. The method as claimed in claim 9, involving the reading by the scanning device of:
  the codes of the benchmarks that are spread over an area greater than 1 km$^2$,
  the codes of benchmarks that are spread at a density greater than 100 per km$^2$,
    the codes of benchmarks that are separated by a distance of between 5 and 100 m, and/or
    the codes of benchmarks that are positioned in said frame of reference with location accuracy greater than 0.4 m.

20. A method for mounting at least one topographic benchmark formed by an attachment having an identifier inherent thereto, for implementing the method as defined in claim 9 involving:
  the mounting of the benchmark,
  the geolocation of the benchmark thus mounted in a given frame of reference,
  the possible recording in a database of the identifier of the benchmark and the position of the benchmark in said frame of reference.

21. The method as claimed in claim 20, wherein information relating to the positional accuracy of the benchmark in said frame of reference is also recorded in the database, so as to allow this information to be subsequently accessed by providing the identifier of the benchmark as input.

22. A method for mounting at least one topographic benchmark formed by an attachment on a support, having an optical code inherent thereto, for implementing the method as defined in claim 9, this method involving:
  the geolocation of the location on the support intended to receive the benchmark in a given frame of reference,
  the generation of an optical code containing the geolocation information, such that the scanning device can read the code and automatically collect this information,
  the permanent securing at said location of the topographic benchmark provided with the code thus generated.

23. The method as claimed in claim 22, wherein the code includes information about the accuracy with which the position of the location intended to receive the benchmark is known in said frame of reference.

24. Method for geolocating the terrestrial scanning device of a system as claimed in claim 1, wherein:
  an optical acquisition is carried out with the aid of the terrestrial scanning device, this optical acquisition including at least the topographic benchmark,
  the code of the benchmark is read automatically,
  the position of the benchmark in a given frame of reference is determined from this code, and
  at least this information is used to locate the scanning device.

* * * * *